Figure 1:
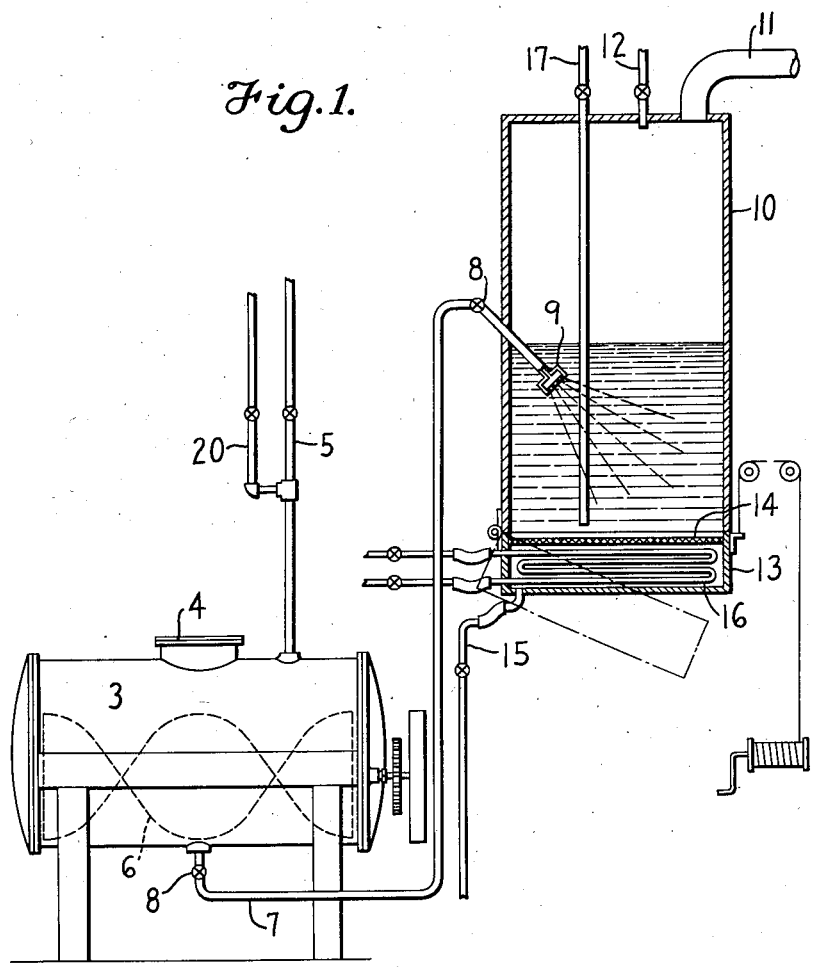

Feb. 5, 1935. L. M. BURGHART 1,990,113
APPARATUS FOR MANUFACTURE OF CELLULOSE ESTERS
Original Filed April 30, 1929   2 Sheets-Sheet 1

INVENTOR
Lloyd M. Burghart
BY
ATTORNEY

Patented Feb. 5, 1935

1,990,113

UNITED STATES PATENT OFFICE 1,990,113

APPARATUS FOR MANUFACTURE OF CELLULOSE ESTERS

Lloyd M. Burghart, Linthicum Heights, Md., assignor to U. S. Industrial Alcohol Co., New York, N. Y., a corporation of West Virginia Original application April 30, 1929, Serial No. 359,367, now Patent No. 1,839,295. Divided and this application June 25, 1931, Serial No. 546,769

2 Claims. (Cl. 23—260)

This invention relates to apparatus for the manufacture of cellulose esters of organic acids, for example cellulose acetate, and for obtaining the same in a physical condition favorable for drying and all other subsequent treatments.

In my Patent No. 1,816,564, dated July 28, 1931, I disclosed a process for making cellulose acetate, in which liquid sulfur dioxide is employed to advantage as the reaction medium or solvent. In the said patent and in Patent 1,822,563, dated September 8, 1931, a continuation in part of Patent 1,816,564, I disclosed that liquid sulfur dioxide was not only an advantageous liquid medium for the esterification reaction, but also for a then-ensuing hydration treatment, the purpose of such treatment, as is well known, being to convert so-called primary cellulose acetate into an acetone-soluble form, or other form more suitable for industrial purposes because of its solubility characteristics.

The present application is a division of my Patent 1,839,295, dated January 5, 1932, also a continuation in part of Patent 1,816,564.

Patent 1,839,295 is directed to the process of making or obtaining cellulose esters of organic acids as a product of low apparent density and loose structure, this being accomplished by discharging the solutions or fluid reaction masses from the pressure system under such conditions that gaseous sulfur dioxide is abruptly released from the issuing material and is utilized to expand or disrupt the cellulose ester. Precipitation of the cellulose ester is effected with the aid of a sufficiently large quantity of water or other liquid in which the cellulose ester is insoluble and by which it is coagulated. By releasing the gas from within the precipitating ester while it is in the act of coagulating in contact with the precipitating liquid an especially advantageous result is secured. The opening up of the precipitating masses facilitates removal of unused acetic acid values and other substances which may be present. Furthermore, the physical condition of the ester is such that bleaching, purification, stabilizing and other subsequent operations involving the penetration of treating agents are made much easier. Also, the loose structure makes possible quick and easy drying, and is an advantage when it comes to dissolving the finished products in various solvents prior to use. Cellulose acetate products thus obtained, whether of the chloroform-soluble, alcohol-chloroform-soluble, or acetone-soluble type, or other type of solubility, may vary in the degree of subdivision, but generally speaking are loose, fluffy and of low apparent density. Aside from the physical form, it is evident that the material is much affected in its structure by the expanding force.

The object of the invention claimed in the present application is to provide apparatus for carrying out the process and producing the product claimed in Patent 1,839,295.

The apparatus includes a closed pressure vessel for holding the colloidal solution or reaction mass under the vapor pressure of the liquid sulfur dioxid. This vessel is provided with an outlet for the fluid mass, from which outlet there extends a pipe provided with one or more valves which can be opened to discharge the solution under the pressure of the sulfur dioxid. From this pipe the material is expelled into an enclosed precipitation and gas-release chamber having an offtake through which the sulfur dioxid gas passes freely to a recovery system. Provision is made for causing the issuing solution to come into contact with the precipitating liquid in or adjacent this chamber simultaneously with the violent liberation of the gas. The interior of the chamber is at atmospheric pressure, or at very much lower pressure than the high pressure under which the solution is discharged from the pressure vessel. Provision is also made for supplying heat at the region of expansion and precipitation to overcome chilling effect of the vaporization of the sulfur dioxid and to insure instantaneous liberation of the gas in large volume.

Figure 2:
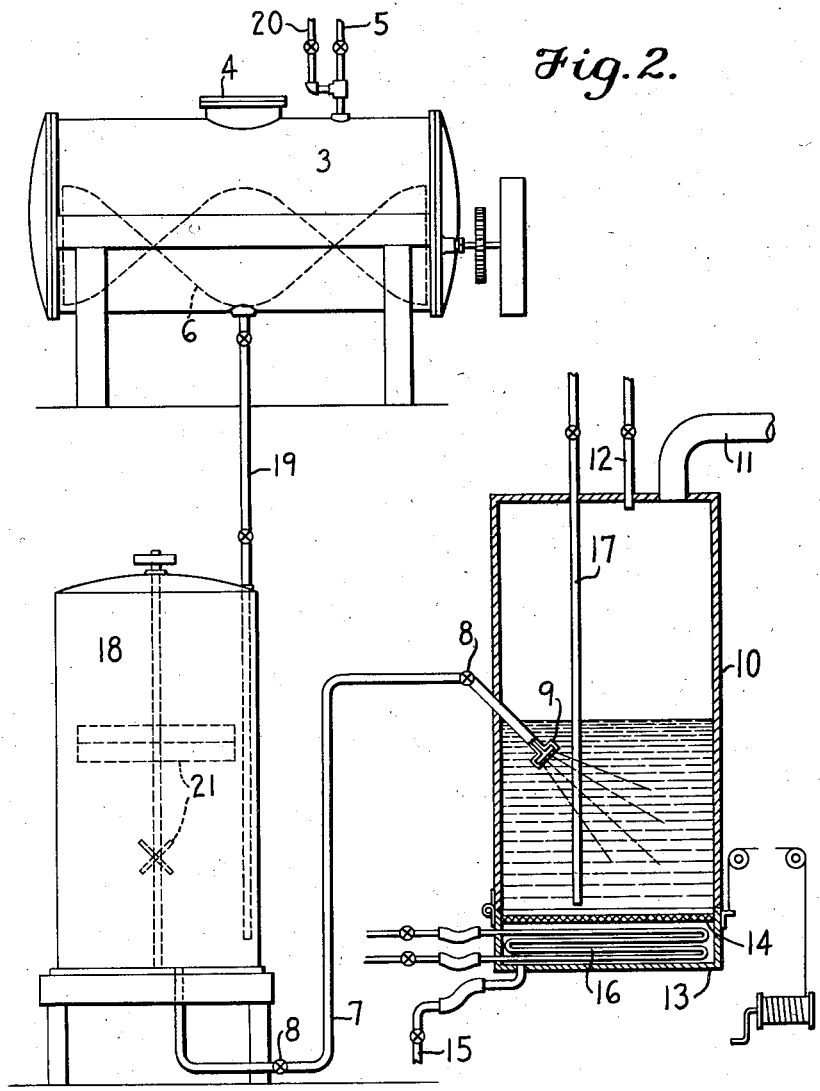

In the accompanying drawings forming part hereof;

Fig. 1 is a view partly in elevation and partly in section of one form of equipment for making the cellulose ester and for precipitating it in accordance with this invention; and Fig. 2 is a similar view of another combination of equipment for carrying out the invention.

In Fig. 1, the numeral 3 designates a closed reaction vessel adapted to retain the required pressure, this vessel being provided with a cover 4 which can be tightly closed and can be removed, and with valved inlets 5 and 20 for introducing liquid materials. Within the vessel there is a stirrer 6 arranged to be driven by power. A discharge pipe 7 is connected with the lower portion of the vessel and is provided with one or more valves 8. This pipe terminates in a nozzle 9 having a suitable number of comparatively small exit openings, and when the charge is precipitated this nozzle is below the level of a body of water or other precipitating liquid in a chamber 10. This chamber is enclosed and has an offtake 11 for collecting and freely conducting away the sulfur dioxid gas, to be liquefied for re-use. The region inside the enclosure 10 may be considered an expansion chamber. The pressure therein at the time of precipitation may be atmospheric or somewhat above, or the pressure may be reduced to any desired degree below atmospheric pressure by appropriate means.

The precipitation chamber is shown provided with a valved inlet 12 for admitting precipitating liquid, and with a tight hinged bottom 13 for discharging the precipitated cellulose, after the liquid has been drawn off through a filter 14 and a valved line 15 leading to an acetic acid recovery system. A moderate amount of heat may be supplied by a steam coil 16 in the bottom 13 beneath the filter 14, or by a valved steam line 17 having its outlet a short distance above the filter 14 so as to be submerged by the body of precipitating liquid.

The material treated for esterification may be cellulose in any suitable form, or a cellulose derivative, for example, hydro-cellulose, and the acetylation may be preceded by any appropriate pre-treatment.

The following is given as a specific example.

100 parts of cellulose, 260 parts of acetic anhydride as an acetylating agent, 1000 parts of liquid sulfur dioxide, and 3 parts of sulfuric acid as a catalyst or condensing agent, are digested and stirred in the vessel 3 at a suitable temperature, for example, at about 20°–30° C., and at corresponding pressure, until test shows that the reaction has proceeded to the desired degree.

The cellulose or cellulose derivative is placed in the vessel through the opening which is ordinarily tightly closed by the cover 4, and the liquid materials may be introduced through the valved inlet 5.

During the course of the treatment the cellulose loses its original structure and the cellulose acetate dissolves in the liquid sulfur dioxid, the result at the end of the operation being that of a thickish liquid or semi-fluid mass, practically homogeneous and readily flowable through pipes under pressure of the $SO_2$ gas or vapor; the precise consistency of the fluid mass or liquid varying according to the amount of liquid medium present and other conditions.

In the example given, it will be understood that the solution of cellulose acetate in liquid sulfur dioxid existing when the acetylation reaction has been carried to the desired point, contains also the small amount of catalyst, the surplus acetic anhydride and some acetic acid.

If cellulose acetate of a type resulting from an acetylation reaction is desired, or if the acetylation operation is not to be followed by a hydration treatment in the same general solution, the valve or valves 8 are now opened, and the fluid mass is delivered by the pressure of the $SO_2$ through the pipe 7 and its perforated nozzle 9 into contact with the water in the chamber 10. By the abrupt release of the gas pressure from the issuing streams the chloroform-soluble or alcohol-chloroform-soluble cellulose acetate is disrupted at the moment of precipitation, in the manner which has been described.

The employment of precipitating liquids other than water is permissible and presents certain advantages. For example, in order to avoid the breaking down of the surplus acetic anhydride, which is expensive, and to facilitate recovery of the acetic acid, the solution obtained at this time can be precipitated in similar manner in or with carbon tetrachlorid, benzene, toluene or other non-aqueous precipitating liquid, to secure the light structured ester product.

The precipitated cellulose acetate, after preliminary separation from the liquid, may be washed and dried, and may then constitute an article of commerce; or, after washing or drying, or without performing these operations, it can be re-dissolved in liquid sulfur dioxide and then be subjected to a separate hydration treatment to modify it to another type of solubility.

For various reasons, however, it is advantageous, when the acetone-soluble variety, or some other variety, is desired, to proceed with the hydration treatment without separating the ester from the original $SO_2$ solution or mixture resulting from the acetylation stage.

This may be carried out in the same vessel, but for operating economy it is more desirable to transfer the fluid reaction mass from the acetylation vessel to another closed pressure vessel 18, shown in Fig. 2, the two vessels being connected by a valved pipe 19 through which the transfer is made when the valve or valves are opened.

The hydration treatment is essentially a digestion of the solution or mixture, to which has been added a limited amount of a hydrating medium, typically water, the amount of such water being less than will cause precipitation. As is well understood, the amount of hydrating agent should be enough to break down the unused acetic anhydride left from the acetylation treatment and leave a surplus of water, a surplus on the order of 3%–5% of the reaction mixture present being sufficient.

The hydrating agent or mixture may be introduced into the vessel 18, but there is a practical advantage in admitting it to the mass in the vessel 3 shortly before the transfer of the contents to the vessel 18, advantage being taken of the thorough mixing action of the stirrer of the acetylating vessel.

As a concrete example, 55 parts of water and 6 parts of sulfuric acid may be introduced through the valved connection 20 to the mixture in the vessel 3 about 20 minutes before the transfer is made, the mass being then run into the vessel 18 and being there digested, preferably with mild stirring by stirrers 21, until the test samples indicate the desired degree of acetone-solubility, or other desired type of solubility. This digestion may be carried out at 65°–70° C., but lower temperatures around 45° C. are preferable.

When the hydration treatment has been carried as far as is desired, the solution is usually more liquid than that resulting from the acetylation reaction, and this solution, consisting of cellulose acetate in solution or suspension in the liquid sulfur dioxid and such amount of acetic acid as is present, together with such other ingredients as there may be, is discharged through the pipe 7 and its nozzle 9, on the opening of the valve or valves 8, into contact with water or other precipitating liquid in an expansion chamber 10 similar to the one already described.

It is sufficient that the pressure at the precipitating and expanding region be approximately atmospheric, though naturally the explosive action of the gas on the colloidal masses may be promoted by partial vacuum or by heat or by both.

The sudden and substantially complete release of the gas pressure from within the precipitating masses and the effect upon the form and structure of the product is substantially the same as in the case of "primary" cellulose acetate.

The invention is also applicable to the manufacture and treatment of other cellulose esters of organic acids, for example cellulose propionate and cellulose benzoate.

The products after being precipitated are washed and dried in a suitable manner.

The invention is also applicable to the treatment of previously manufactured esters of cellulose, obtained by any process of manufacture. For example, cellulose acetate, of any of the types of solubility, which has been made by the usual process in an acetylating bath consisting of acetic anhydride, acetic acid and sulfuric acid, and which has or has not been hydrolyzed, can, at any time, after the completion, or partial completion, of its manufacture, be put into solution in liquid sulfur dioxid and be discharged from the region of high pressure where it is so held into a region of low pressure where it is precipitated in contact with water or an equivalent medium, in order to put the material into the improved physical condition the attainment of which constitutes the ultimate object of the invention herein claimed.

As a further extension of the invention, the cellulose esters can be made and/or hydrated by any of the known processes, for example those utilizing glacial acetic acid as a liquid medium, and when the acetylation and/or the hydration has been carried to the desired stage of completion, or before such time, an amount of liquid sulfur dioxid sufficient to provide an enormous volume of gas can be introduced into a closed pressure vessel containing the reaction mixture, and the solution can then be discharged and precipitated in the manner described so as to effect the opening up of the ester masses.

In each of the applications of the invention which have been described a solution, or a condition similar to a solution, of the desired cellulose ester is formed under pressure in liquid sulfur dioxid, though the liquid sulfur dioxid need not be the only solvent present, and the solution or fluid jell is then discharged and precipitated in such manner as to secure the abrupt release of the $SO_2$ gas pressure from within the preciptating material, in order to disrupt the same.

The precipitating liquid probably tends to form films at the surfaces of the expanding globules, which are immediately ruptured by the internal pressure, and it seems likely that the collapse of such films and the further setting of the cellulose ester structure accounts for the kind of gross structure which may be obtained.

I claim:

1. Apparatus for obtaining cellulose esters in disrupted condition from colloidal solutions, comprising a closed vessel adapted to hold the solution under the pressure of a normally gaseous constituent, a precipitation and gas-release enclosure, means for conducting gas from said enclosure for recovery and for insuring a relatively low pressure in said enclosure, a conduit constituting a direct connection between the lower portion of said vessel and said enclosure adapted to transfer the entire charge from the former to the latter, valve means for closing said conduit, and for opening the same so that the solution will be discharged under pressure from said vessel and released from pressure in said enclosure, a perforated outlet for delivering the solution in the form of jets, and means for supplying a precipitating liquid to contact with the issuing jets, substantially as and for the purpose set forth.

2. Apparatus for obtaining cellulose esters in disrupted condition from colloidal solutions, comprising a closed vessel adapted to hold the solution under the pressure of a normally gaseous constituent, a precipitation and gas-release enclosure, means for conducting gas from said enclosure for recovery and for insuring a relatively low pressure in said enclosure, a conduit constituting a direct connection between the lower portion of said vessel and said enclosure adapted to transfer the entire charge from the former to the latter, valve means for closing said conduit, and for opening the same so that the solution will be discharged under pressure from said vessel and released from pressure in said enclosure, a perforated outlet for delivering the solution in the form of jets, means for supplying a precipitating liquid to contact with the issuing jets, and means for supplying heat to the issuing solution and the precipitating liquid, substantially as and for the purpose set forth.

LLOYD M. BURGHART.